(12) United States Patent
Kolsto et al.

(10) Patent No.: US 11,556,569 B2
(45) Date of Patent: Jan. 17, 2023

(54) VISUALIZING MACHINE LEARNING MODEL PERFORMANCE FOR NON-TECHNICAL USERS

(71) Applicant: INTERNATIONAL BUSINESS MACHINES CORPORATION, Armonk, NY (US)

(72) Inventors: Ellen R. Kolsto, Austin, TX (US); Mark Marrara, Round Rock, TX (US); Joel Russell Huffman, Austin, TX (US); Stefan A. G. Van Der Stockt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 16/872,640

(22) Filed: May 12, 2020

(65) Prior Publication Data

US 2021/0357802 A1 Nov. 18, 2021

(51) Int. Cl.
*G06K 9/62* (2022.01)
*G06F 16/28* (2019.01)
(Continued)

(52) U.S. Cl.
CPC ......... *G06F 16/287* (2019.01); *G06K 9/6267* (2013.01); *G06K 9/6272* (2013.01);
(Continued)

(58) Field of Classification Search
CPC .......... G06N 20/00–20/20; G06N 3/02–3/105; G06T 2207/20081; G06T 2207/20084;
(Continued)

(56) References Cited

U.S. PATENT DOCUMENTS 5,274,714 A 12/1993 Hutcheson et al.
5,412,765 A 5/1995 Yamrom et al.
(Continued)

FOREIGN PATENT DOCUMENTS

CN 108363714 A 8/2018

OTHER PUBLICATIONS

O'Neil, "Weapons of Math Destruction: How Big Data Increases Inequality and Threatens Democracy", BOOKS, Sep. 6, 2016, 5 pages total (2 cover pages, bib page, 2 table of contents pages). (Year: 2016).*

(Continued)

*Primary Examiner* — Brian Werner
(74) *Attorney, Agent, or Firm* — Teddi E. Maranzano (57) ABSTRACT

A method, system, and computer program product for visualizing a machine learning model are provided. A confusion matrix and model performance metric data are received from a classification model. For each data point in the confusion matrix, a corresponding pixel is generated. The pixels are grouped into clusters. Each cluster represents a label in the confusion matrix. A centroid is generated for each cluster. Using the model performance metric data, a misclassification indicator arrow is generated for each misclassified data point. The misclassification indicator arrow indicates both the predicted class and the actual class. The clusters, the centroids, and the misclassification indicator arrow are displayed as a graphical visualization of the machine learning model.

20 Claims, 5 Drawing Sheets

(51) Int. Cl.
  *G06N 3/08* (2006.01)
  *G06N 20/00* (2019.01)
  *G06N 5/04* (2006.01)
  *G06F 16/26* (2019.01)

(52) U.S. Cl.
  CPC .............. *G06N 3/08* (2013.01); *G06F 16/26* (2019.01); *G06N 5/04* (2013.01); *G06N 20/00* (2019.01)

(58) Field of Classification Search
  CPC ....... G06T 3/4046; G06T 9/002; G06V 10/82; G06V 10/762–10/7635; G06K 9/6262–9/6265; G06K 9/6267–9/6287; G06F 16/355; G06F 16/358
  See application file for complete search history.

(56) References Cited

U.S. PATENT DOCUMENTS

| | | | |
|---|---|---|---|
| 9,886,669 | B2 | 2/2018 | Amershi et al. |
| 10,719,301 | B1* | 7/2020 | Dasgupta ............. G06K 9/6267 |
| 2012/0158623 | A1 | 6/2012 | Bilenko et al. |
| 2015/0242761 | A1 | 8/2015 | Amershi et al. |
| 2018/0075368 | A1* | 3/2018 | Brennan ................ G06N 20/00 |
| 2019/0065848 | A1 | 2/2019 | Borrel et al. |

OTHER PUBLICATIONS

Hu et al., "VizML: A Machine Learning Approach to Visualization Recommendation", arXiv:1808.04819v1, Aug. 14, 2018, pp. 1-14.
Disclosed Anonymously, "Stylizing Map Based on Examples of Representative Styling", An IP.com Prior Art Database Technical Disclosure, IP.com No. IPCOM000252003D, IP.com Electronic Publication Date: Dec. 13, 2017, 38 pages.
Disclosed Anonymously, "Image Moderation Using Machine Learning", An IP.com Prior Art Database Technical Disclosure, IP.com No. IPCOM000252007D, IP.com Electronic Publication Date: Dec. 13, 2017, 35 pages.
Disclosed Anonymously, "Ranking and automatic selection of machine learning models", An IP.com Prior Art Database Technical Disclosure, IP.com No. IPCOM000252275D, IP.com Electronic Publication Date: Jan. 3, 2018, 34 pages.
Szafir, "Utilizing Color for Perceptually-Driven Data Visualization", A dissertation submitted in partial fulfillment of the requirements for the degree of Doctor of Philosophy, (Computer Sciences), at the University of Wisconsin-Madison, Jul. 7, 2015, 231 pages.
O'Neil, "Weapons of Math Destruction: How Big Data Increases Inequality and Threatens Democracy", BOOKS, Sep. 6, 2016, 5 pages total (2 cover pages, bib page, 2 table of contents pages).

* cited by examiner

VISUALIZING MACHINE LEARNING MODEL PERFORMANCE FOR NON-TECHNICAL USERS

BACKGROUND

Embodiments of the invention generally relate to computer systems, and more specifically, to visualizing machine learning (ML) model performance for non-technical users.

Currently, training ML classification models tends to be time consuming, in part, because of the need to refine the model to account for gaps in the data. The training becomes more challenging because often those who are training models tend to be non-technical users such as subject matter experts or business analysts. Not being primarily data scientists, non-technical users may face the challenges of knowing how well the model classified the data and how to add data to improve the model. It may therefore be advantageous to provide non-technical users the ability to understand and improve their machine learning models.

SUMMARY

Among other things, a method is provided for visualizing a machine learning model are provided. A confusion matrix and model performance metric data are received from a classification model. For each data point in the confusion matrix, a corresponding pixel is generated. The pixels are grouped into clusters. Each cluster represents a label in the confusion matrix. A centroid is generated for each cluster. Using the model performance metric data, a misclassification indicator arrow is generated for each misclassified data point. The misclassification indicator arrow indicates both the predicted class and the actual class. The clusters, the centroids, and the misclassification indicator arrow are displayed as a graphical visualization of the machine learning model.

Embodiments are further directed to computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE SEVERAL VIEWS OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

DETAILED DESCRIPTION

The present disclosure relates generally to the field of user computing technologies, and in particular to communicating complex machine learning model performance metrics, such as precision and recall, into an easy to understand visualization for non-technical users.

The present disclosure is model-agnostic and applies to various classification models, such as logistic regression, decision tree, and Naïve Bayes. Dimensionality reduction techniques combined with vector field visualization show data science performance measures. The visualization of the machine learning (ML) classification model shows the one-to-one relationship between the performance metrics (i.e., confusion matrices, recall and precision scores, and receiver operating characteristic (ROC) curves) and their visualization. The one-to-one visualization of the classification model to the displayed data enables the non-technical user to identify gaps more efficiently in the data where training data for the model can be improved. This is because the correctly classified and the mis-classified data elements, the class imbalances, and the biases in the data are shown without having to interpret the underlying data, for example, using the classification matrix. Therefore, various embodiments of the present invention enable a non-technical user to visualize the training process of their ML model to see where the model either correctly or incorrectly classifies existing data. The visualization shows where the ML model does not have enough data to correctly make classifications. The visualization maintains a one-to-one relationship between the performance metrics of the confusion matric and the non-technical visualization, providing the ability to alternate between the two views.

Figure 1:
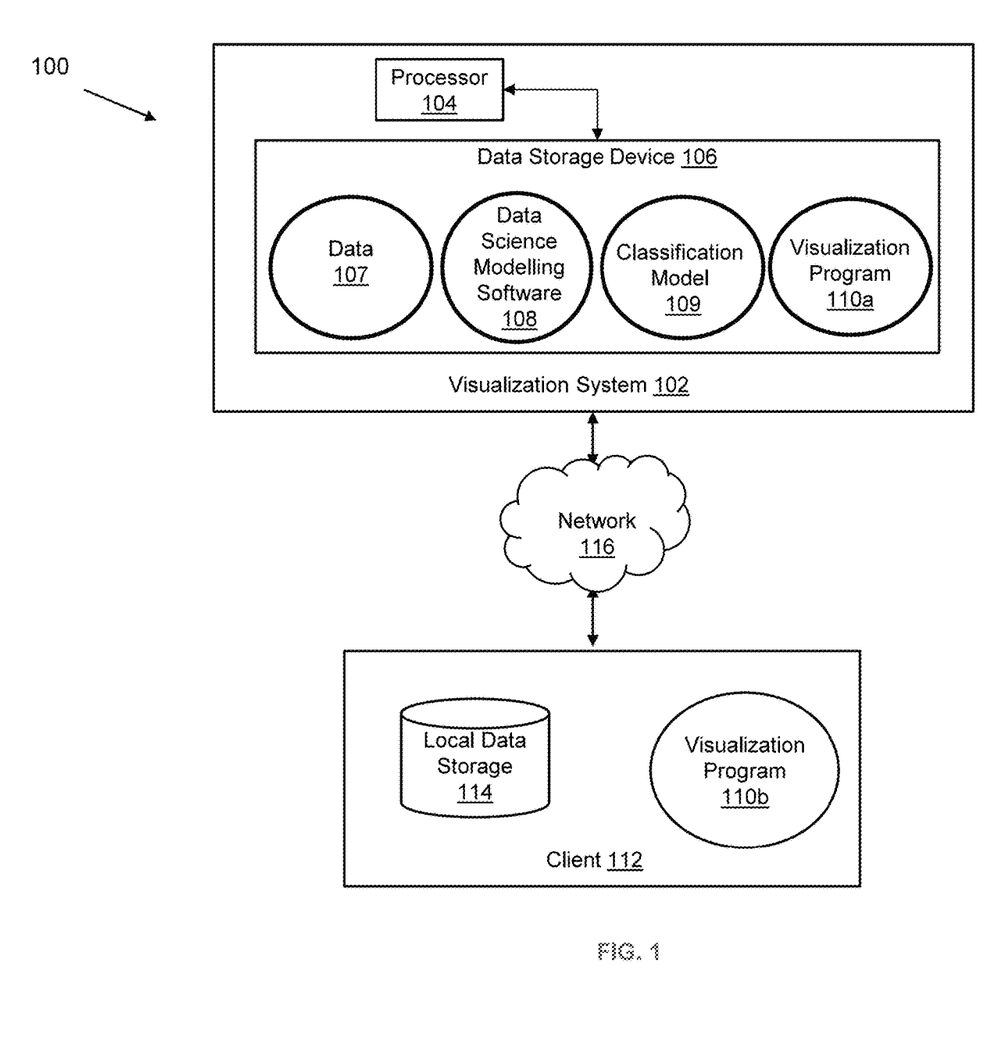
FIG. 1 is a functional block diagram of an illustrative system, according to an embodiment of the invention.

FIG. 1 is a functional block diagram of an illustrative networked visualization computing environment 100, according to an embodiment of the present invention. The networked visualization computer environment 100 includes a visualization system 102, and a plurality of clients 112, only one of which is shown. The client 112 communicates with the visualization system 102 over the network 116. The network 116 can include various types of communication networks, such as a wide area network (WAN), local area network (LAN), a telecommunication network, a wireless network, a public switched network, and/or a satellite network. It should be appreciated that FIG. 1 provides only an illustration of one implementation and does not imply any limitations with regard to the environments in which different embodiments may be implemented. Many modifications to the depicted environments may be made based on design and implementation requirement.

The visualization system 102 is embodied on a computer having at least one processor 104 and at least one data storage device 106. The data storage device 106 includes storage for data 107, data science modeling software 108, at least one classification model 109, and the visualization program 110a. The data science modeling software 108 can be any comprehensive data analytic workflow software, such as that used for building, training, and deploying machine learning models. The classification model 109 may be the output of the data science modeling software 108. The visualization program 110a communicates with the data science modeling software 108 to dynamically visualize the output data of the classification model 109. For example, the visualization program 110a may publish an API for use by programs, such as the data science modeling software 108, so that the visualization program 110a can access and interpret the data that was output to the classification model 109.

The client 112 includes the visualization program 110b, by which the client 112 may access the visualization system 102 remotely, using the network 116. The visualization program 110b on the client 112 may communicate with the data science modeling software 108 through the visualization program 110a. The client 112, may view the data of the classification model 109 using the visualization program 110b, which communicates with the visualization program 110a, or may execute various functions that the data science modeling software 108 may provide. The client 112 may retrieve the data of the classification model 109 from the data storage device 106 and store the data locally on the local data storage 114 for visualization.

Embodiments of the present invention take as input user supplied data 107 that is curated for a specific classification goal. The user may input the data 107 in any form that is compatible with the data science modeling software 108, such as CSV, JSON, database. The data science modeling software 108 uses a method, such as k-fold validation, and the data 107 to train and test the machine learning model. The data science modeling software 108 uses known performance evaluation methods, such as confusion matrices (and all their derived measures, including precision and recall) and the Receiver Operating Characteristic (ROC) curve to plot how well the classification model 109 distinguishes between true positives and true negatives. The classification model 109 can be represented as a confusion matrix, where each row represents instances in a predicted class and each column represents the instance in the actual class. The data science modeling software 108 also calculates performance measures of the classification model 109, such as recall, accuracy, and precision. These performance measures are stored with the classification model 109. The data science modeling software 108 uses any method, such as t-Distributed Stochastic Neighbor Embedding (t-SNE), vector projection, and self-organizing map (SOM), to reduce the model's n-dimensional training data into a two-dimensional representation, such as a data cluster. The training data comprises not only the confusion matrix, but all the data points, which can be thousands, or more.

Bifurcations, e.g., data points on the edge between two groups, may indicate a sensitive decision boundary. Small changes in the data may yield improvements in the classifications that can be visualized.

Figure 2:
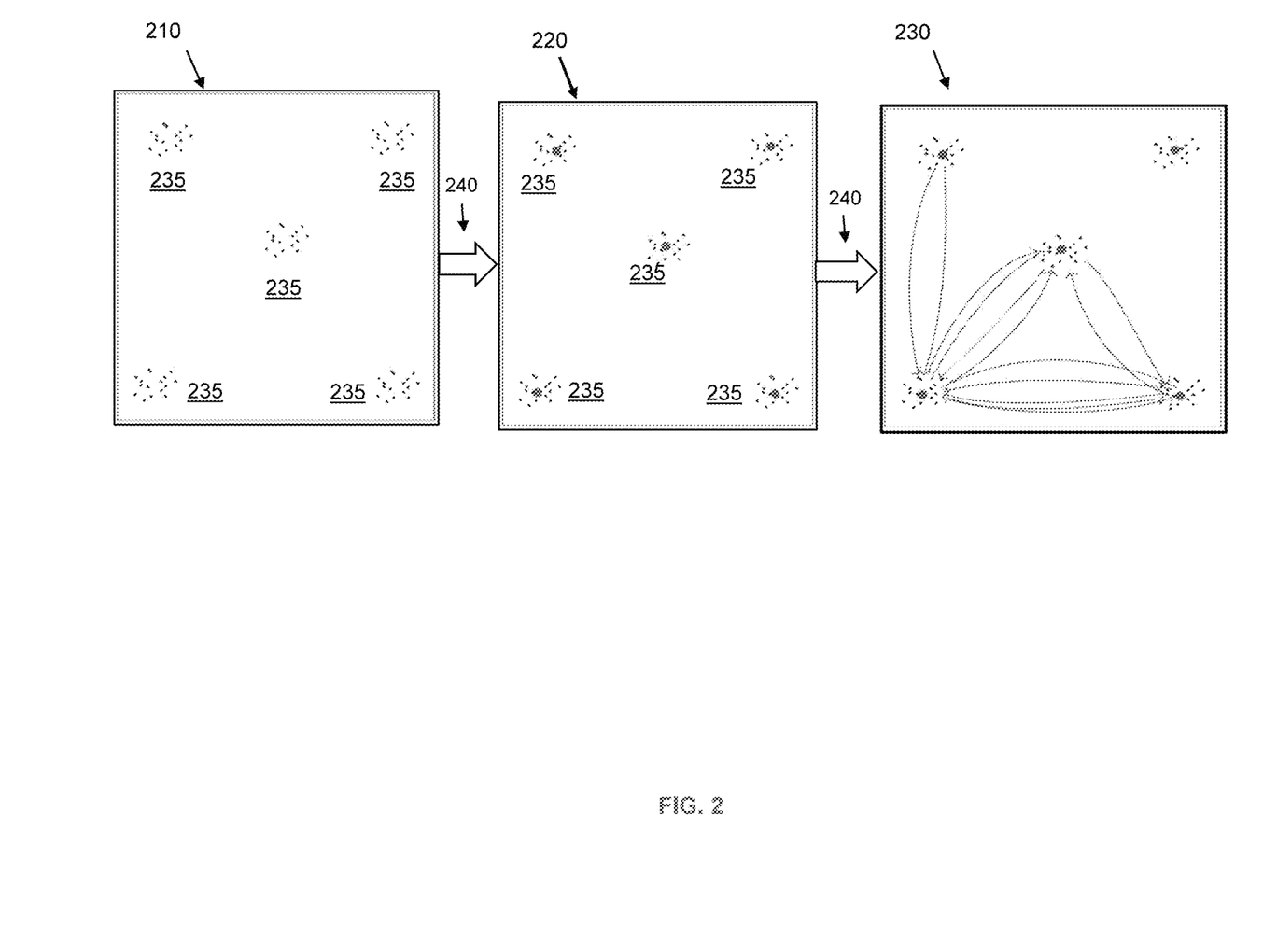
FIG. 2 is an exemplary visualization of a classification model.

The visualization program 110a inputs the confusion matrix data and performance measures and creates the visual overlay, discussed further with reference to FIG. 2. The x and y coordinates of the pixel placement on the visual overlay may be directly retrieved if t-SNE created the data cluster. However, the pixel placement may also be derived using a graphical programming language that outputs the pixel layout based on the number of required pixels and number of groups (classifications). For each classification, and using any suitable method, the visualization program 110a determines the centroid, which is the representative data point for the group. The variance in the data of the classification model 109 is shown as variance in the distance between the pixels in each group from the centroid, and from each other.

Each dot in the visualization is a row in the classification model data 109, and each group in the visualization is an associated label. Therefore, each dot that lies off the diagonal in the confusion matrix is mis-classified and properly belongs in another group (cluster). The visualization program 110a analyzes the data in the confusion matrix to determine into which group the dot should have been classified. For each mis-classified dot, the visualization program 110a generates an arrow, where the root of the arrow originates at the mis-classified dot, and the head of the arrow ends at the correct group. Therefore, each misclassified data point (dot) will have an arrow to show the error in classification. The arrow can be generated using a graphical programming language that outputs the arrow based on the desired x and y coordinates.

FIG. 2 are views of an exemplary visualization of a classification model 109. The group view 210 shows a high-level view of the data points in the classification model 109. The data points are shown as pixels. Each group 235 of pixels represents a label in the classification model 109, such as images of dogs, images of birds, images of cats etc. Each individual pixel represents an element that the data science modeling software 108 classified as belonging in the group 235. The placement of the pixels is based solely on the truth labels in the training data. In current practice, the groups may be shown as overlapping, as in a Venn diagram, making it difficult to understand the accuracy of the model. However, embodiments of the present invention place the groups so that each group 235 is individually viewable. An algorithm, either a custom algorithm or one such as t-SNE may be used to determine the screen layout of the groups.

In a t-SNE approach, when the visualization program 110a builds each group 235, even if the groups overlap, the groups can be visually separated, for example, using color, highlighting, flashing elements of the display, etc. This enhanced visualization can be generated using a graphical programming language. The effect is based only on the labels in the training data. For example, if a user selects to see all images of dogs, all the pixels representing dogs will be enhanced, even if misclassified in another group, because the number of images of dogs is a known quantity from the training data. Having some of these images located in another group indicates there may be confusion at a fundamental level. For example, is a dog misclassified as a cat because of mistaken similarity in the images?

In a non-t-SNE implementation, the visualization program 110a directly builds the disjoint groups 235 (e.g., cats, dogs, birds, etc.), ensuring they do not overlap. The number of examples of each label is in the training data. The visualization program 110a deterministically groups each type (i.e., dogs, cats, etc.) together. In this way, there is no accidental overlap of a dog, for example, in a cat group.

The centroid view 220 shows each group 235 with the addition of the centroid of the group 235. The centroid is the most representative data point, such as the mean, within the group 235. The pixel representing the centroid may be shown as the largest pixel in the group, or may be shown in a distinctive color, to highlight its importance. The space between the pixels represents the degree of variation from the centroid.

Figure 3:
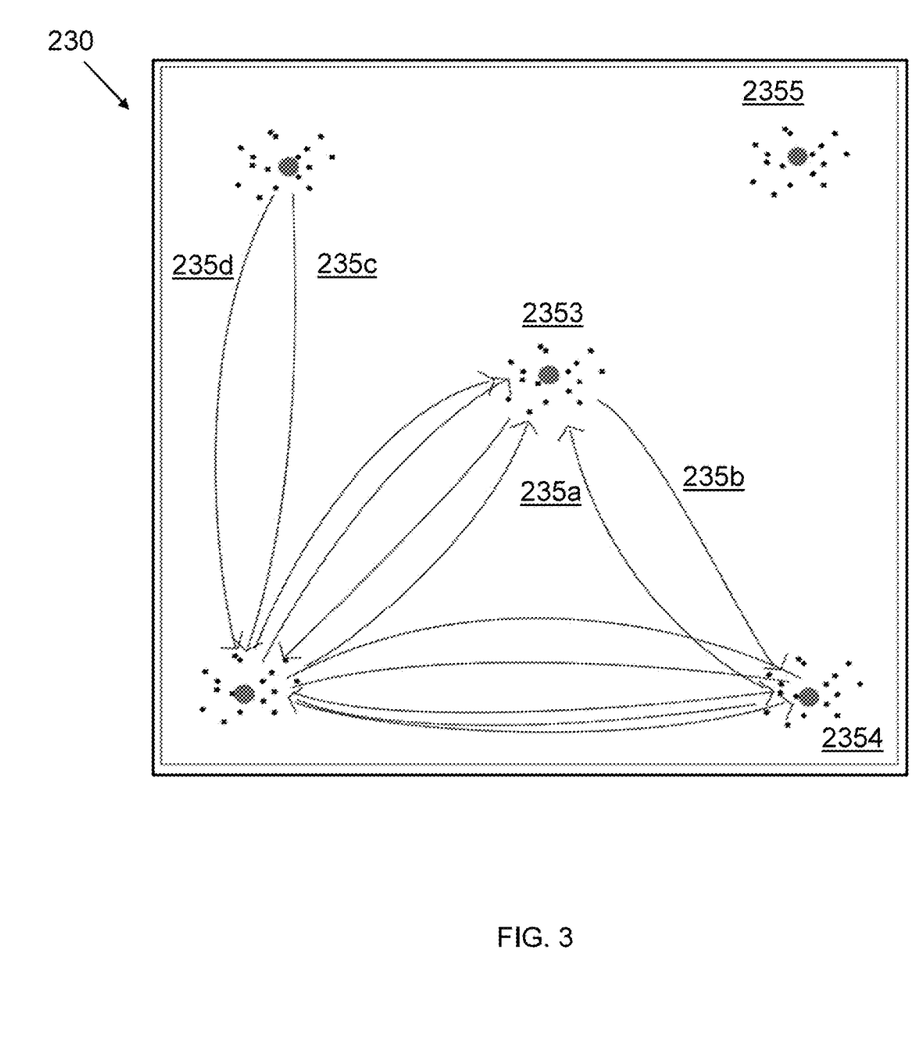
FIG. 3 is a detail of an exemplary classification model visualization.

The misclassification view 230, further discussed with reference to FIG. 3, shows the pixels corresponding to each data point that the data science modeling software 108 incorrectly classified.

The arrows 240 indicate the direction of the visualization of the data, from simply displaying the groups, to adding the complexity of showing the misclassifications. The data science modeling software 108 and the visualization program 110a may communicate through a published API to display the views 210, 220, and 230 on a screen, or to format the views for a printer. Additionally, the data comprising the visualizations may be exported in a form that can be imported into other tools, such as bar chart, histogram, etc.

A user may switch between the visualized views 210, 220, and 230, and the underlying raw classification data, depending on the implementation of that function in the data science modeling software 108 and the visualization program 110*a*. Additionally, the user may separately select each view through a tab, a menu, or the like, or the user may choose to see the three views simultaneously. The data science modeling software 108 and the visualization program 110*a* may cooperate to display a customer-generated label for each view.

FIG. 3 is a detail of the misclassification view 230 of FIG. 2. Each arrow indicates a data point that the classification model 109 misclassified. The root of each arrow, such as arrows 235*a* through 235*d* identifies the individual pixel corresponding to the data point that is classified into a group 235 in error. The point of the arrow identifies the group 235 into which the data point should have been classified. Therefore, the arrow is a misclassification indicator. The arrow can be generated using a graphical programming language that outputs the arrow based on the desired x and y coordinates. Additionally, the arrow may be colored to highlight the origin (root), for example in red, and direction (point of the arrow) in green. The model's confidence can be also displayed, for example, as a spectrum from the red to the green (e.g., from red, to orange, then green). Paired arrows, such as 235*a* and 235*b* indicate a two-way error in classification. That is, the data point indicated by arrow 235*a* was misclassified in group 2354, and should have been classified in group 2353. The data point indicated by arrow 235*b* was misclassified in group 2353, but should have been classified in group 2354. As can be seen by the root of the arrows, this is not a cancelling out of data points, but two distinct data points having errors. A group without arrows, such as group 2355, indicate that all the data points were properly classified in the classification model 109.

Figure 4:
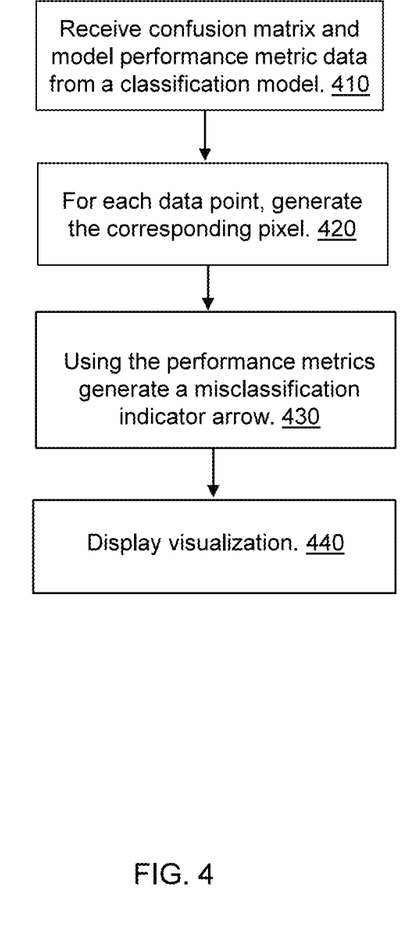
FIG. 4 is a flowchart of visualizing the classification model.

FIG. 4 is a flowchart of visualizing the classification model. At 410, the visualization program 110*a* receives the classification model 109 from the data science modeling software 108. The classification model 109 includes the confusion matrix and its associated performance metrics. The performance metrics include values that can be calculated from the confusion matrix, including recall, specificity, and precision.

At 420, for each data point in the confusion matrix, the visualization program 110*a* calculates the pixel placement in the visualization using an algorithm such as t-SNE. The algorithm determines measurements such as true positives and true negatives, which the visualization program 110*a* uses to calculate the x and y pixel placement.

At 430, the visualization program 110*a* uses the measurements calculated in 420, along with the performance metrics in the classification matrix to calculate the misclassification indicator arrow placement and direction.

At 440, the visualization program 110*a* displays the visualization.

Figure 5:
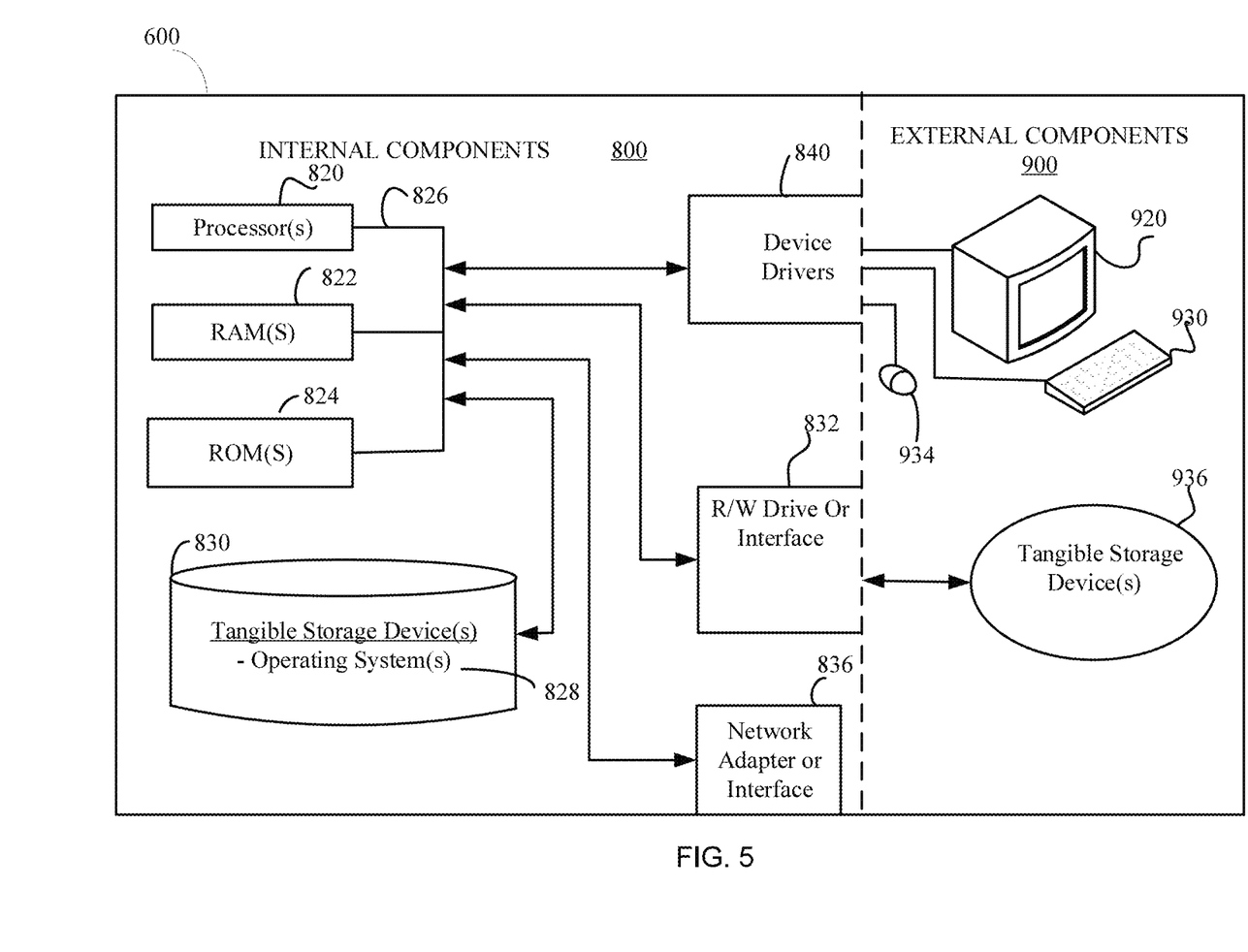
FIG. 5 is an illustrative functional block diagram of a computing device for implementing aspects of the present invention, according to an embodiment of the invention.

FIG. 5 illustrates an exemplary computing device 600 applicable for executing the algorithm of FIG. 4. Computing device 600 may include respective sets of internal components 800 and external components 900 that together may provide an environment for a software application. Each of the sets of internal components 800 includes one or more processors 820; one or more computer-readable RAMs 822; one or more computer-readable ROMs 824 on one or more buses 826; one or more operating systems 828 executing the algorithm of FIG. 4; and one or more computer-readable tangible storage devices 830. The one or more operating systems 828 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, USB memory stick, and magnetic disk.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 600, can be downloaded to computing device 600 from an external computer (e.g., server) via a network (for example, the Internet, a local area network, or other wide area network) and respective network adapters or interfaces 836. From the network adapters (or switch port adapters) or interfaces 836 and operating system 828 associated with computing device 600 are loaded into the respective hard drive 830 and network adapter 836.

External components 900 can also include a touch screen 920, keyboard 930, and pointing device 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for visualizing a machine learning model, comprising:
   receiving raw data comprising a confusion matrix and model performance metric data from a classification model;
   for each data point in the confusion matrix, generating a corresponding pixel;
   grouping the pixels into clusters, wherein each cluster represents a label in the confusion matrix, and generating a centroid for each cluster;

using the model performance metric data, generating a misclassification indicator arrow for each misclassified data point, wherein the misclassification indicator arrow indicates both a predicted class and an actual class; and displaying the clusters, the centroids, and the misclassification indicator arrow as a graphical visualization of the machine learning model.

2. The method of claim 1, wherein each of the displayed clusters are spatially separated and do not overlap.

3. The method of claim 1, wherein there is a one-to-one correspondence between each data point in the confusion matrix and each pixel in the graphical visualization of the machine learning model.

4. The method of claim 1, wherein a root of the misclassification indicator arrow originates at a misclassified pixel, and a head of the misclassification indicator arrow ends at a correct cluster.

5. The method of claim 1, wherein the cluster not having at least one misclassification indicator arrow has no misclassified data points.

6. The method of claim 1, wherein a distance between the pixels in each cluster from the centroid indicates a degree of variance in the classification model.

7. The method of claim 1, further comprising:
alternating between the displaying of the graphical visualization of the machine learning model and raw data from the confusion matrix and the model performance metric data.

8. A computer program product for visualizing a machine learning model, wherein the computer program product comprises a computer readable storage medium having program instructions embodied therewith, the program instructions executable by a processing unit to cause the processing unit to perform a method comprising:
receiving raw data comprising a confusion matrix and model performance metric data from a classification model;
for each data point in the confusion matrix, generating a corresponding pixel;
grouping the pixels into clusters, wherein each cluster represents a label in the confusion matrix, and generating a centroid for each cluster;
using the model performance metric data, generating a misclassification indicator arrow for each misclassified data point, wherein the misclassification indicator arrow indicates both a predicted class and an actual class; and
displaying the clusters, the centroids, and the misclassification indicator arrow as a graphical visualization of the machine learning model.

9. The computer program product of claim 8, wherein each of the displayed clusters are spatially separated and do not overlap.

10. The computer program product of claim 8, wherein there is a one-to-one correspondence between each data point in the confusion matrix and each pixel in the graphical visualization of the machine learning model.

11. The computer program product of claim 8, wherein a root of the misclassification indicator arrow originates at a misclassified pixel, and a head of the misclassification indicator arrow ends at a correct cluster.

12. The computer program product of claim 8, wherein a distance between the pixels in each cluster from the centroid indicates a degree of variance in the classification model.

13. The computer program product of claim 8, further comprising:
alternating between the displaying of the graphical visualization of the machine learning model and the raw data from the confusion matrix and the model performance metric data.

14. A computer system for visualizing a machine learning model, comprising:
one or more processors; and a computer-readable memory coupled to the one or more processors, the computer-readable memory comprising instructions for:
receiving raw data comprising a confusion matrix and model performance metric data from a classification model;
for each data point in the confusion matrix, generating a corresponding pixel;
grouping the pixels into clusters, wherein each cluster represents a label in the confusion matrix, and generating a centroid for each cluster;
using the model performance metric data, generating a misclassification indicator arrow for each misclassified data point, wherein the misclassification indicator arrow indicates both a predicted class and an actual class; and
displaying the clusters, the centroids, and the misclassification indicator arrow as a graphical visualization of the machine learning model.

15. The computer system of claim 14, wherein each of the displayed clusters are spatially separated and do not overlap.

16. The computer system of claim 14, wherein there is a one-to-one correspondence between each data point in the confusion matrix and each pixel in the graphical visualization of the machine learning model.

17. The computer system of claim 14, wherein a root of the misclassification indicator arrow originates at a misclassified pixel, and a head of the misclassification indicator arrow ends at a correct cluster.

18. The computer system of claim 14, wherein a distance between the pixels in each cluster from the centroid indicates a degree of variance in the classification model.

19. The computer system of claim 14, further comprising:
alternating between the displaying of the graphical visualization of the machine learning model and raw data from the confusion matrix and the model performance metric data.

20. The computer system of claim 14, wherein the cluster not having at least one misclassification indicator arrow has no misclassified data points.

* * * * *